UNITED STATES PATENT OFFICE.

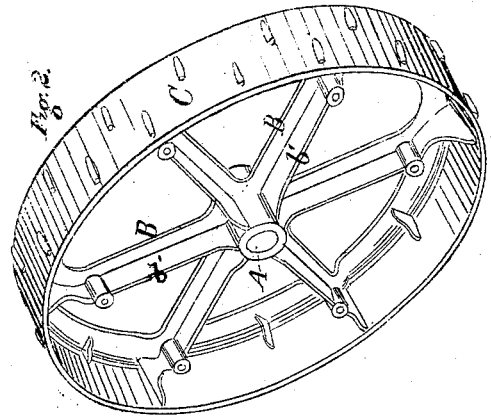
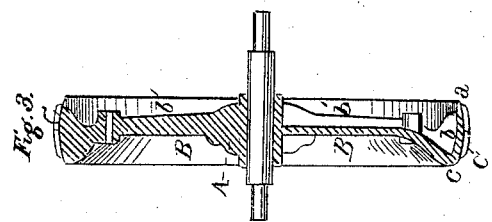
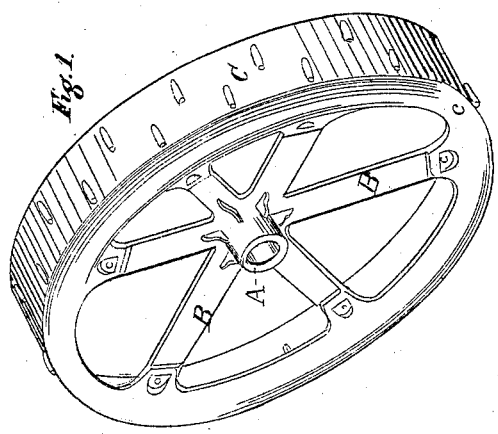

JOHN P. MANNY, OF ROCKFORD, ILLINOIS.

IMPROVEMENT IN HARVESTERS.

Specification forming part of Letters Patent No. 38,053, dated March 31, 1863.

*To all whom it may concern:*

Be it known that I, JOHN P. MANNY, of Rockford, in the county of Winnebago and State of Illinois, have invented a certain new and useful Improvement in Driving-Wheels for Harvesters, of which the following is a full, clear, and exact description, reference being had to the accompanying drawings, which make part of this specification, and in which—

Figure 1 represents a view in perspective of the outer side of a driving-wheel for harvesters embracing my improvements; Fig. 2, a similar view of the other side of the same, and Fig. 3 a section through the same at the line *o o* of Fig. 2.

Experience has demonstrated the necessity of employing a large spur-wheel in order to give the requisite number of vibrations to the cutters of a harvester to each revolution of the driving-wheel. This arrangement requires the lower portion of the spur-wheel to be brought so near the ground that when running in a soft soil the gearing is apt to become clogged with mud and dirt. Moreover, even where a small spur-wheel is used, the mud and dirt carried up by the driving-wheel in its revolution is apt to drop on the gearing and clog it or cause it to cut out rapidly. Various attempts have heretofore been made to remedy this evil; but so far it is believed none of them have been practically successful. The driving-wheel most used is made with a thin face or tread and spokes or arms connecting it to the hub, and sometimes the gearing is arranged within the plane of the wheel; but as such wheels have no flanges the rim would cut into the soft soil and throw dirt upon the gearing as rapidly as if it were outside the plane of the wheel, especially upon hillsides. It has likewise been proposed to use a solid flange or plate extending from the hub to the rim of the driving-wheel, and to cast or fasten the gear-wheel upon it outside of the plane of the wheel. This plan is, in my opinion, objectionable, first, because placing the gearing outside of the plane of the wheel renders it necessary correspondingly to increase the width of the gearing-frame; and, second, the entire gearing is by this arrangement exposed to the dirt carried round by the driving-wheel. Another form of wheel heretofore used consisted of a spoke-wheel with a flange about three inches wide acst upon each side of the rim. It has, however, been found in practice that the trough thus formed around the rim, when running in soft ground, soon becomes filled up with mud or dirt, which is carried round and dropped upon the gearing. Again, in casting a wheel with a flange on each side of the rim it is necessary to employ cores, which renders the wheel too expensive for practical use.

It is the object of my invention to combine the advantages of both a spoke and a plate wheel, while avoiding the defects incident to them as heretofore constructed; and to this end the improvement claimed under this patent consists in so constructing the wheel that the arms shall be arranged in a plane passing through the center of the rim, to which they are connected by a flange which is flush with the edge of the rim nearest the gearing, substantially as hereinafter shown.

To carry out the objects of my invention, I construct the driving-wheel with a plate or flange running around the rim of the wheel on the side next the gearing, in order to prevent dirt from being carried up by the rim and deposited upon the gearing. This flange is slightly curved or rounded, especially at its point of intersection with the rim, in order that it may present a convex surface to the ground and crush it out of its way, instead of cutting into it, whereby dirt is prevented from being carried up so readily by the wheel. To prevent any dirt that may be carried up from being thrown or dropped into the gearing, I place the main gear-wheel within the plane of the driving-wheel, so that the gearing will be protected. In order to do this, I cause the flange of the wheel gradually to curve inward (as it approaches the gearing) until it reaches a plane passing through the center of the rim.

In the accompanying drawings my improved driving-wheel is shown as cast in one piece and as consisting, mainly, of a hub, A, a series of spokes or arms, B, and of a rim or tread, C, which latter I prefer to make about five and a half inches in width. In order to reduce the cost, the trouble, and the labor of casting the wheel, I make it of the following form: Commencing at the inner edge of the rim, (at the point marked *a* in the drawings,) it increases slightly in thickness toward the center *b* of the rim, thus giving a "draft" from that point to *a*. From *b* the draft turns the other way with an inclination sufficient to allow the sand to lift off with the cope, which retains the upper half of the hub only. The draft of the inner side of the wheel is sufficient to allow the remainder of the pattern to be easily withdrawn from the flask. The flange or rim C is curved inward in a convex form, as shown in Fig. 3, until it joins the arms B, which are arranged in a plane passing through the wheel at or near its center. This arrangement enables me to make the wheel of nearly uniform thickness throughout, which renders its shrinkage in cooling uniform and prevents the straining of the wheel. The arms B are strengthened by means of flanges or rims $b'$, and are placed so near the center that the main spur-gear may be within the plane of the wheel. This spur-gear may be either bolted upon the arms of the wheel or cast with it; but I prefer the former alternative. The wheel might likewise have a solid plate in place of arms; but this would render it unnecessarily heavy and increase its expense.

By my invention, as above described, I secure a light, cheap, and strong wheel, protect the gearing from dirt, and secure other advantages, which will readily be appreciated by those practically familiar with the business.

I deem it unnecessary here to describe the details of the other portions of the gearing, as they form no part of the subject-matter herein claimed, and are, besides, described in another application for Letters Patent of the United States filed simultaneously with this.

I am aware that driving-wheels with flanges have heretofore been used. I am also aware that the main spur-gear has heretofore been placed within the plane of the driving-wheel, and therefore do not broadly claim either of such devices, although, so far as my knowledge extends, they differ materially in construction and arrangement from mine, as hereinbefore explained; but,

Having thus described the construction and operation of my improved wheel for harvesters, what I claim therein as new, and desire to secure by Letters Patent, is—

The combination of the rim or tread and a plate or series of arms arranged in or nearly in a plane passing through the center of said rim, with a flange connecting the two, and flush with the edge of the rim next the gearing, when constructed substantially as described, and for the purposes set forth.

In testimony whereof I have hereunto subscribed my name.

JOHN P. MANNY.

Witnesses:
  EDM. F. BROWN,
  J. SNOWDEN BELL.